March 12, 1963  J. L. SAUNDERSON  3,080,788
SPECTROSCOPIC APPARATUS WITH AUTOMATIC
CORRECTION OF MISALIGNMENT
Filed Feb. 18, 1960  9 Sheets-Sheet 1

FIG. 1

INVENTOR
Jason L. Saunderson
BY Morse & Altman
ATTORNEY

March 12, 1963  
J. L. SAUNDERSON  
3,080,788  
SPECTROSCOPIC APPARATUS WITH AUTOMATIC CORRECTION OF MISALIGNMENT  
Filed Feb. 18, 1960  
9 Sheets-Sheet 8

INVENTOR  
Jason L. Saunderson  
BY Morse & Altman  
ATTORNEY

FIG. 14

United States Patent Office 3,080,788
Patented Mar. 12, 1963

3,080,788
SPECTROSCOPIC APPARATUS WITH AUTOMATIC CORRECTION OF MISALIGNMENT
Jason L. Saunderson, Lexington, Mass., assignor to Baird-Atomic, Inc., Cambridge, Mass., a corporation of Massachusetts
Filed Feb. 18, 1960, Ser. No. 9,627
6 Claims. (Cl. 88—14)

The present invention relates to spectrum analysis and, more particularly, to spectrometers of the so-called "direct reading" type which automatically indicate the chemical composition of a specimen by determining the intensity distribution of radiation of characteristic wavelengths emitted by the specimen under excitation.

By way of example, a typical direct reading spectrometer comprises an entrance slit that transmits specimen radiation from an electrically excited specimen, a diffraction grating that forms a spectrum from radiation so transmitted, and a plurality of exit slits that transmit radiation of preselected wavelengths to photocells in order to determine the differing intensities of the radiation at these wavelengths. In such a spectrometer, the spatial relationships among the entrance slit, the grating and the exit slits are so critical that minor changes in ambient temperature, for example, cause their misalignment and, in consequence, a spectrum shift capable of introducing errors into the determination of intensities.

The present invention contemplates the automatic correction of any such misalignment with unusual precision and dependability by a servo-system that is photo-electrically controlled by what may be termed "monitor radiation" from a source other than the excited specimen. This monitor radiation is transmitted to a detector and a servo system via the grating or optical means in association therewith. The physical construction is such that any misalignment among the grating and the entrance and exit slits for the radiation from the excited specimen is accompanied by corresponding misalignment between the monitor radiation and its detector. More specifically, the servo system comprises a novel source of at least two beam components, either simultaneous or sequential, and a detector for generating at least two corresponding signal components in response thereto. The arrangement is such that a misalignment of the grating is accompanied by a misdirection of the beam components with respect to the detector. In consequence the flux densities of the beam components, at the detector become unbalanced and the correspondingly altered intensities of the signal components constitute a servo feedback.

The primary object of the present invention is to provide a servo system of the aforementioned type which comprises generally a novel automatic balancing means that is responsive to the monitor radiation for controlling the orientation of the diffraction grating with reference to the entrance and exit slits. More specifically, the contemplated automatic balancing means includes a mechanically operative "chopper" for producing monitor radiation beam components of the foregoing type in such a way as to obviate fluctuations in the electrical power supply, ageing of the monitor radiation source, etc. The chopper, in various forms, includes: a rotating element having upper and lower optical passages at right angles to each other; a tuning fork which mounts a plate having offset slits; reflecting means for displacing the beam components and rotating means for passing the beam components alternately; and an obliquely disposed partially transmitting and partially refracting disk that rotates to produce sequential offset beam components.

Other objects of the present invention will in part be obvious and will in part appear hereinafter.

The invention accordingly comprises the devices possessing the features, properties, and relation of components that are exemplified in the following detailed disclosure, the scope of which will be indicated in the appended claims.

For a fuller understanding of the nature and objects of the present invention, reference should be had to the following detailed description taken in connection with the accompanying drawings wherein:

FIGS. 11, 12, 13 and 14, of which

Figure 1:
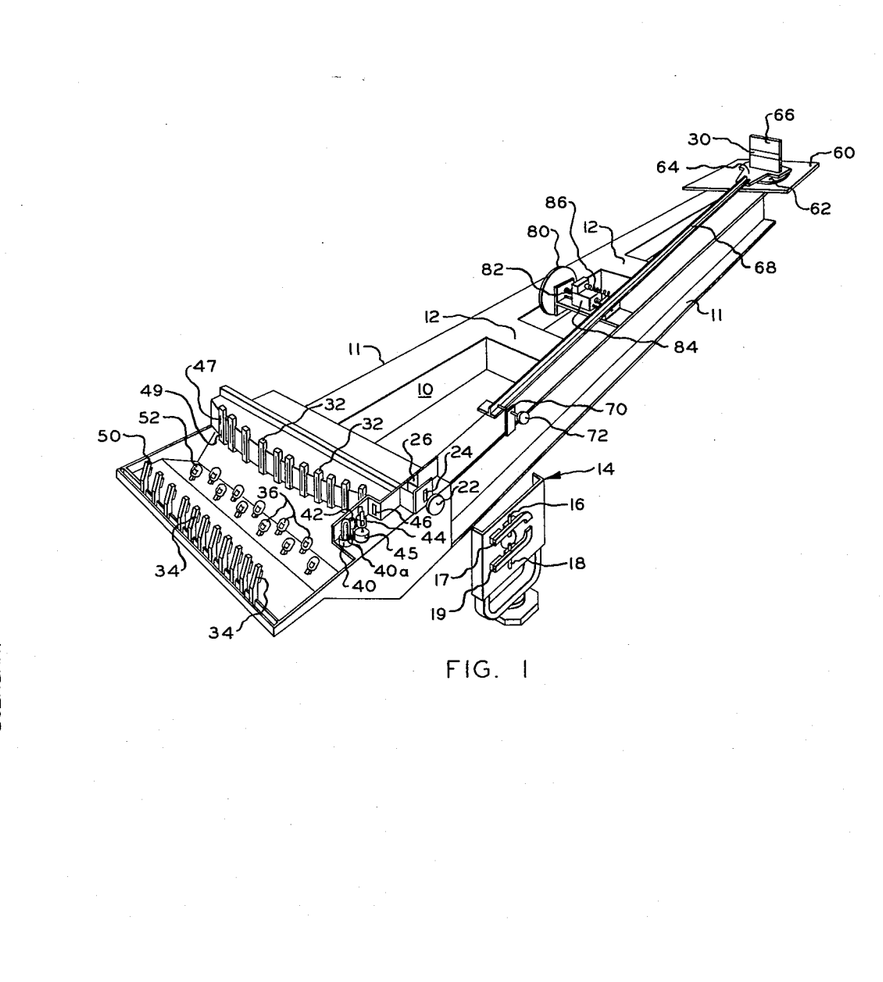
FIG. 1 is a perspective view of significant components of a spectrometer embodying the present invention, these components normally being enclosed within a light-tight housing (not shown)

The mechanical components of the preferred spectrometer of FIG. 1 are mounted on a sturdy A-shaped frame 10 having intersecting longitudinal legs 11 and short cross pieces 12 constructed of heavy gauge channel stock. These mechanical components in operation ar enclosed within a light-tight housing (not shown) which shields its interior from ambient radiation capable of affecting the system now to be described. This system serves to indicate the chemical composition of a specimen by determining the intensity distribution, at selected wavelengths, of radiation emitted by the specimen under excitation in an arc mount assembly 14. In conventional fashion, arc mount assembly 14 comprises a pair of electrodes 16 and 18, for example, in the form of two pins composed of the specimen material. Electrodes 16 and 18 are retained in predetermined relative axial positions by a pair of clamps 17 and 19. Associated with arc mount assembly 14 is a circuit (not shown) for generating a suitable voltage across the gap between the inner ends of electrodes 16 and 18 in order to produce an electrical discharge that is accompanied by characteristic radiation from the specimen. The gap between the inner ends of electrodes 16 and 18 is imaged by a lens 22, a slit 24, and a mirror 26 onto a concave diffraction grating 30 in order to produce a spectrum. Preselected portions (which may be thought of loosely as preselected lines) of this spectrum are directed through respective exit slits 32 and are reflected by mirrors 34 to respective photomultiplier tubes 36. The intensities of these spectrum lines are indicated by these photomultiplier tubes 36 in association with appropriate integrating circuits (not shown).

Figure 11:
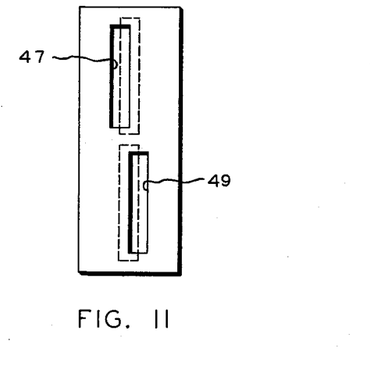
FIGS. 11 and 12 are similar for explanatory purposes, are plan views, on an enlarged scale, of alternative embodiments of one of the components of the servo systems of FIGS. 2, 3 and 4.
Figure 12:
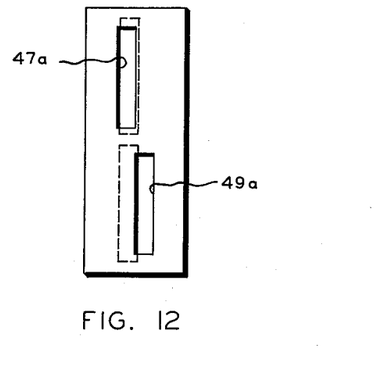

Despite the fact that the above mentioned mechanical components are mounted on a sturdy A-shaped frame 10 and despite the fact that these components are enclosed in a light-tight housing (not shown), small temperature changes, nevertheless, tend to disorient the grating 30 with respect to the entrance and exit slits 24 and 32. In accordance with the present invention, proper orientation is ensured by an automatic servo-system now to be described. This servo system is photoelectrically controlled by monitor radiation. The monitor radiation is in the form of radiation produced by a single filament gas discharge tube 40, preferably containing mercury vapor, in combination with a lens 42 and a differential light-attenuating element as shown in the form of a chopper 44 in FIGS. 1 and 2. Chopper 44 is in the form of a barrel providing a first path 44a and a second path 44b at right angles to each other. Barrel 44a, 44b is mounted on a shaft 44c which is driven by a synchronous motor 45. The transverse portions of the barrel defining each of paths 44a and 44b is such as to interrupt fully the beam generated by tube 40 when placed squarely in the beam's path. The combined vertical extents of the two paths 44a and 44b are equal to the vertical extent of the beam. In the form shown, the beam is produced by an elongated tube 40, having an elongated filament 40a. Alternatively, the beam is produced by the shorter filament of a smaller tube not shown in association with a condensing lens. It has been noted that the axes of paths 44a and 44b are in planes normal to one another. Thus, when the upper portion of the barrel blocks the beam, the lower path 44b transmits the beam. And when the lower portion of the barrel blocks the beam the upper path 44b transmits the beam. The result is that the beam is split into two sequential parts as the barrel rotates. These two alternately bright portions of the monitor beam are directed through an entrance slit 46 toward concave diffraction grating 30. Grating 30 directs these two alternately bright portions of the monitor beam back through slightly offset upper and lower slits 47 and 49, respectively, to a mirror 50 and a photomultiplier tube 52. Normally, the servo system is adjusted so that when diffraction grating 30 is properly oriented, the upper and lower halves of the monitor beam, as shown in dotted lines in FIG. 11, are transmitted in equal intensity through exit slits 47 and 49, respectively. When the diffraction grating 30 becomes improperly oriented, however, more of one portion of the beam and less of the other portion of the beam are transmitted through their respective slits. For example, a slight disorientation of the diffraction grating 30 might cause the upper and lower haves of the beam to move to the left, as viewed in FIG. 12, so that the intensity of upper portion of the beam transmitted through the upper slit 47a would be greater than the intensity of the lower portion of the beam transmitted through the lower slit 49a. Here the resulting unbalance operates to reorient the diffraction grating 30 by means of the circuit and mechanism to be described below in reference to FIG. 2.

Figure 2:
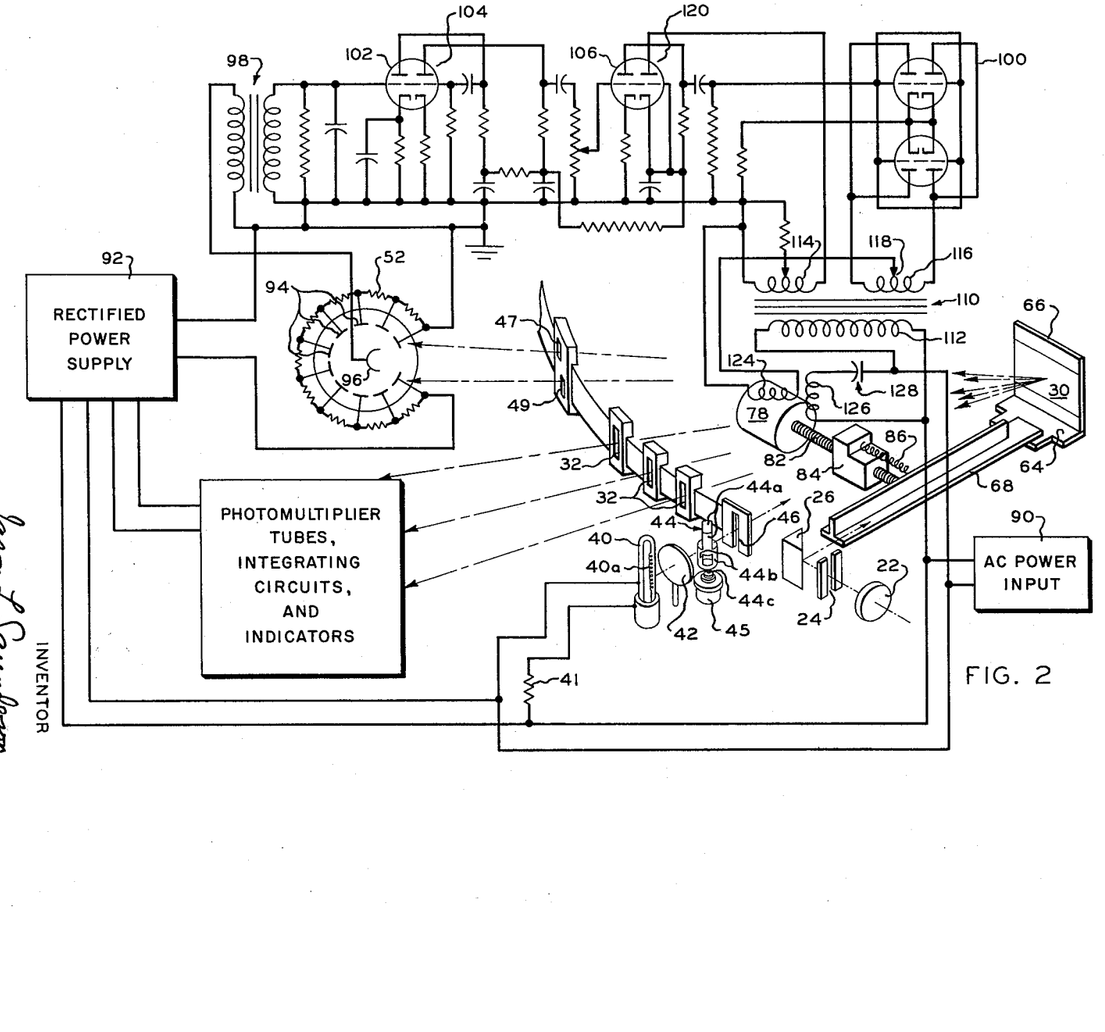
FIG. 2 is a schematic electrical diagram of a preferred servo system incorporating components of FIG. 1.

The mechanical components of the servo system, as shown in FIGS. 1 and 2, include a mount 60 which carries a circular bearing plate 62. A grating frame 64, having vertical portion 66, is rotatably secured to the circular bearing plate 62 in suitable fashion (not shown). Suitable adjustment screws are provided at the four corners of the grating frame 64 by which the grating frame's proper horizontal orientation is effected. The vertical portion 66 of the grating frame 64 carries the diffraction grating 30. Control of the diffraction grating's orientation about a vertical axis is maintained by an elongated lever 68, one end of which is secured to the grating frame 64, and the other end of which is secured to a manually adjustable bracket 70 having a knob 72. For the purpose of initially aligning the grating 30, a circular dial and a pointer (not shown) are provided in association with knob 72 in order to indicate the knob's rotational position. A servo motor 78 is secured to a vertical plate 76 which abuts against the inner edge of a longitudinal leg 11 of A-frame 10. Servo motor 78 drives a gear 80 that is keyed to the inner end of an externally-threaded shaft 82. Carried by shaft 82 is an internally threaded block 84 that rides along the shaft 82 in one direction or the other in response to the direction of the shaft's rotation. A coil spring 86, connected between block 84 and lever 68, exerts a shock-free force on lever 68 that balances the force exerted on lever 68 by manually adjustable bracket 70 in order to maintain proper orientation of diffraction grating 30. Servo motor 78 is controlled by the servo circuit now to be described in reference to FIG. 2.

As indicated above, radiation from the excited specimen under analysis is directed through lens 22 and entrance slit 24, is reflected by mirror 26, and is diffracted by grating 30 toward plurality of exit slits 32. Because of the relatively great distance between grating 30 and entrance an exit slits 24 and 32, slight ambient temperature changes are capable of disorienting the grating.

As indicated above, the servo system shown schematically in FIG. 2 is photoelectrically controlled by monitor radiation in the form of two components that are produced by the action chopper 44 on the single beam emitted by gas discharge tube 40. These portions of the monitor beam after being transmitted through slit 46, diffracted by grating 30 and transmitted by slits 47 and 49, impinge on photomultiplier tube 52. This photomultiplier tube includes dynodes 94 under steady potentials applied by a rectified power supply 92 and a collector anode 96. In response to the two components of the beam, photomultiplier tube 52 generates a succession of electrical pulses which are balanced when the two components are properly oriented and alternate pulses which are unbalanced when the two components are improperly oriented. The collector anode 96 of the photomultiplier tube 52 is connected through an input transformer 98 to three amplifier stages 102, 104, and 106, and a push-pull over stage 100. These stages are energized by an alternating current power supply 90 through a transformer 110 having a primary winding 112. A pair of secondary windings 114 and 116 supply, respectively, a rectifier stage 120 that polarizes amplifier stages 102, 104 and 106, and a push-pull power stage 100. One winding 124 of servo motor 78, which is of the split-phase induction type, is connected between an appropriate intermediate point 118 of secondary winding 116 and ground. The other winding 126 of servo motor 78 is connected to power supply 90 through a capacitor 128 which shifts the wave form in winding 126 into a 90° out-of-phase relationship with respect to the wave form in winding 124.

The operation of the circuit is such that when the alternate pulses, corresponding in time with the positive and negative half cycles of the input power wave form, are equal in magnitude, the rotor of servo motor 78, which thereby is subjected successively to equal and opposite forces, remains stationary. However, when the alternate pulses from photomultiplier tube 52 are unequal in magnitude, a corresponding inequality exists in the wave form of winding 124 so that the pulses of greater amplitude correspond either to the positive or to the negative half cycle of the power input wave form. Because the wave form in winding 124 is 90° out-of-phase from the power input wave form, the rotor of servo motor rotates. The direction of rotation is determined by whether the pulse of greater amplitude in winding 124 coincides with the positive or negative half cycle of the power input wave form. This direction thus is determined by whether the upper portion of the monitor beam transmitted through upper exit slit 47 or the lower portion of the monitor beam transmitted through lower exit slit 48 is of the greater intensity.

Figure 3:
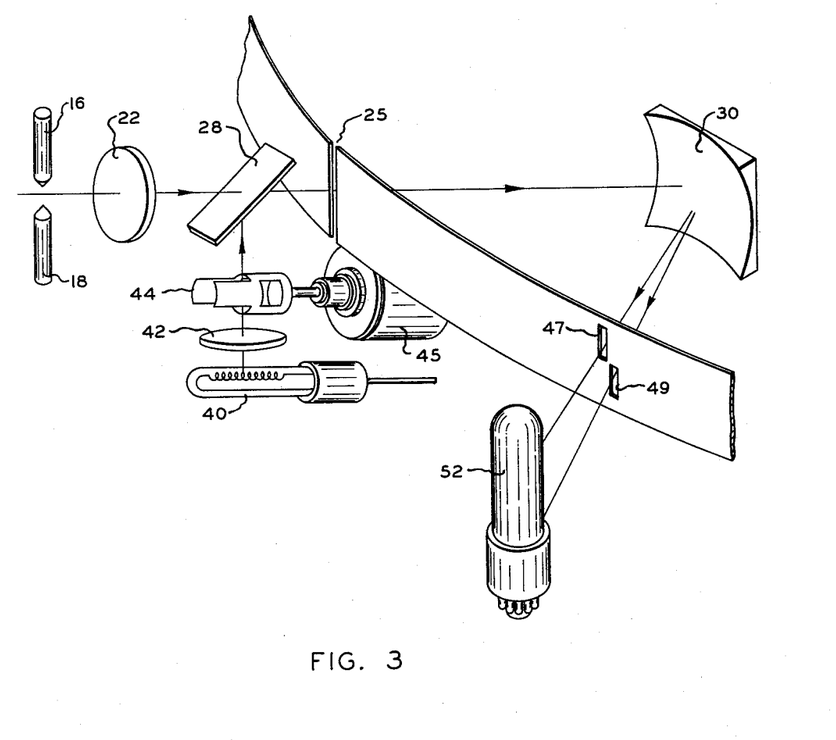
FIG. 3 is a fragmentary perspective view, on an enlarged scale, of a modification of certain of the components of the spectrometer shown in FIG. 1.

An alternative system of monitor beam generation is shown in FIG. 3. This system employs a single entrance slit 25 for both the characteristic radiation from an electrically excited specimen and the monitor radiation. The source of characteristic radiation is shown as including electrodes 16 and 18, from which radiation is transmitted through lens 22 and a quartz plate 28 disposed at an angle with respect to the path of the characteristic radiation. The two portions of the monitor radiation are produced by the operation of chopper 44 in conjunction with gas discharge tube 40. The two portions of the monitor radiation are reflected by quartz plate 28 through entrance slit 25 toward grating 30. It will be noted that in this system both tube 40 and beam interceptor 44 are horizontally disposed in the vertical plane of the characteristic radiation from the excited specimen. The two components of monitor radiation are refracted by grating 30 back through exit slits 47 and 49 to photomultiplier 52 for the production of servo signals of the aforementioned type.

Figure 4:
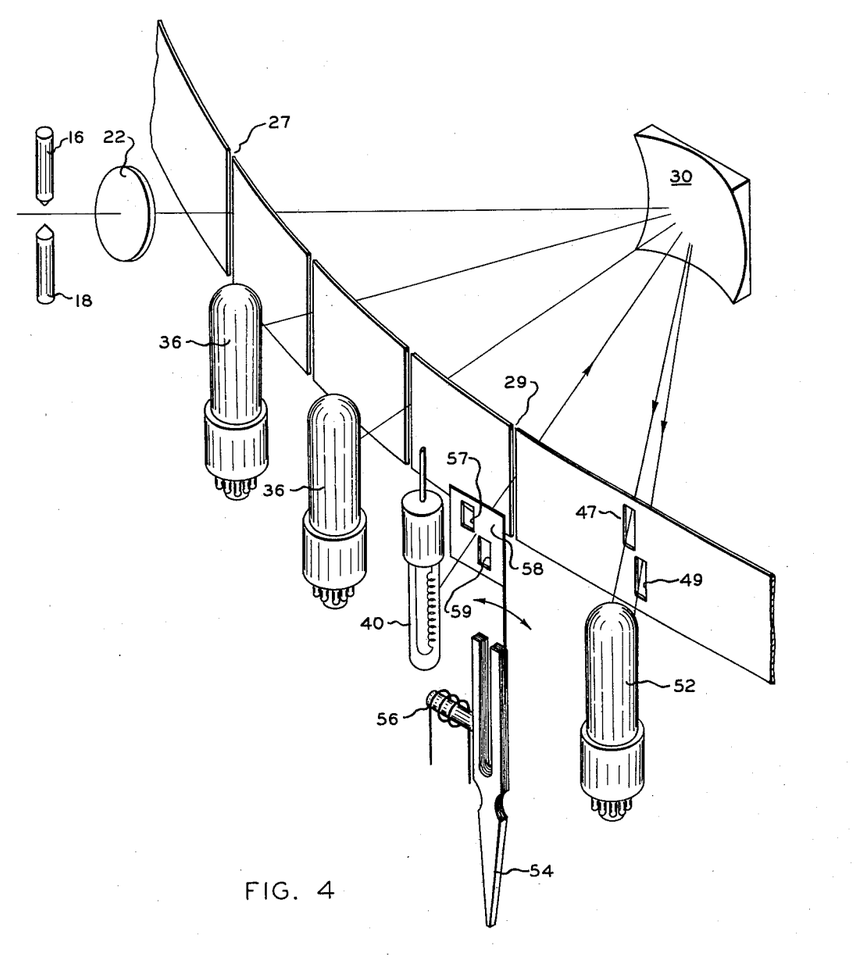
FIG. 4 is a fragmentary perspective view, on an enlarged scale, of another modification of certain of the components of the spectrometer shown in FIG. 1.

Another arrangement of monitor beam generation is shown in FIG. 4. Here, the chopper is in the form of a plate 58 with offset upper and lower slits 57 and 59. Plate 58 is mounted on one arm of a tuning fork 54. A solenoid 56 at the other arm of the tuning fork causes oscillation in phase with the aforementioned amplifier stages. Slits 57 and 59 cooperate with slit 29 to produce two alternate portions of the monitor beam for transmission toward grating 30 and reception through exit slits 47 and 49 by photomultiplier tube 52. In a modification of the embodiment of FIG. 4, the angle slit is mounted on the tuning fork and the offset slits are associated therewith.

Figure 5:
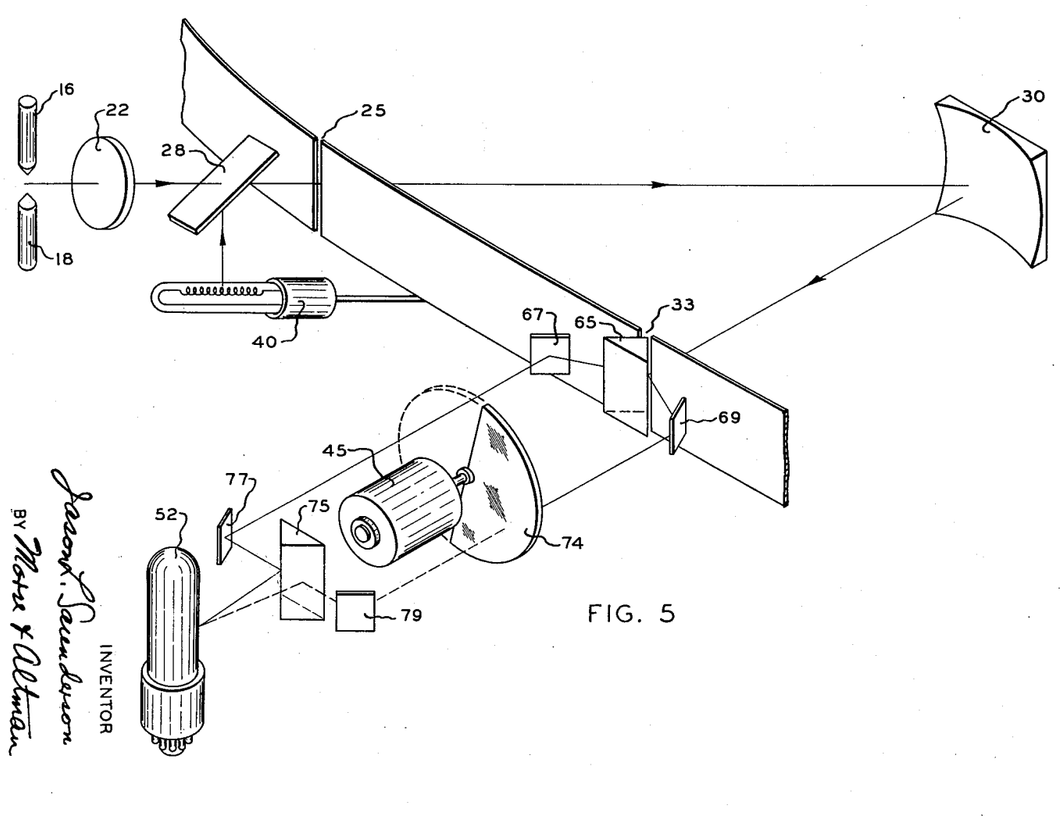
FIG. 5 is a fragmentary perspective view, on an enlarged scale, of still another modification of certain of the components of the spectrometer shown in FIG. 1.

In FIG. 5, the chopper includes a half-disk 74, driven by a synchronous motor 45. Synchronous motor 45 is in the phase with the above described amplifier stages. Half-disk 74 is associated with a pair of prisms 65 and 75 and two pairs of mirrors 67, 69, and 77, 79. In operation a beam of monitor radiation, after being transmitted through single exit slit 33, impinges upon the apex of prism 65. This beam thereby is split into two halves which are reflected by pairs of mirrors 67, 69 and 77, 79 to prism 75 and thence to photomultiplier tube 52. The rotating half-disk 74 alternately interrupts one component or the other component of the monitor beam. When grating 30 is properly oriented, the intensities of these two halves are equal. But when grating 30 becomes improperly oriented, the intensity of one component or the other is greater. The resulting unbalance operates to reorient the grating 30 by means of the above described servo system.

Figure 6:
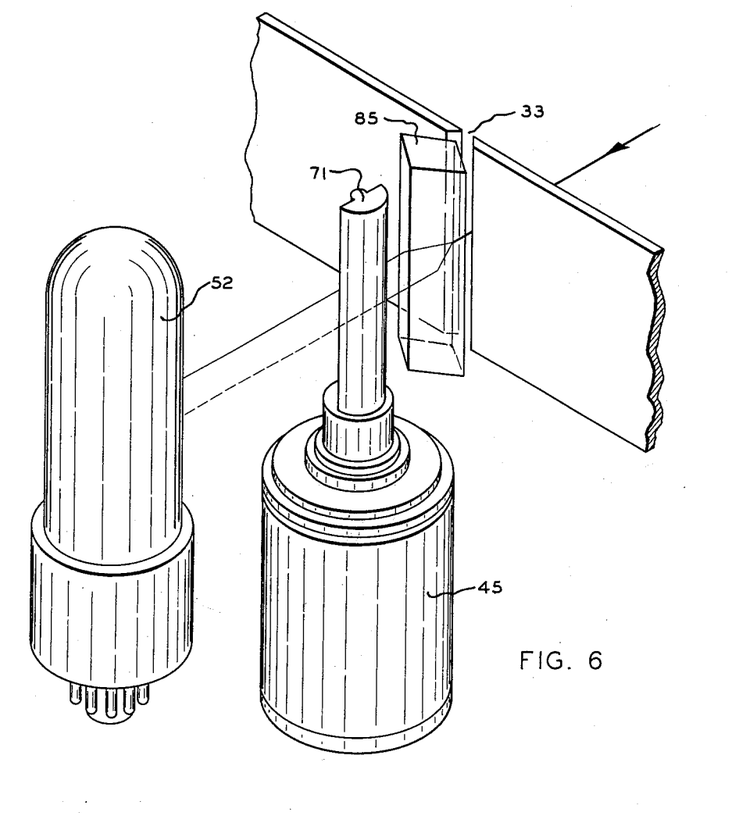
FIG. 6 is a fragmentary perspective view, on an enlarged scale, of yet another modification of certain of the components of a spectrometer shown in FIG. 1.
Figure 7:
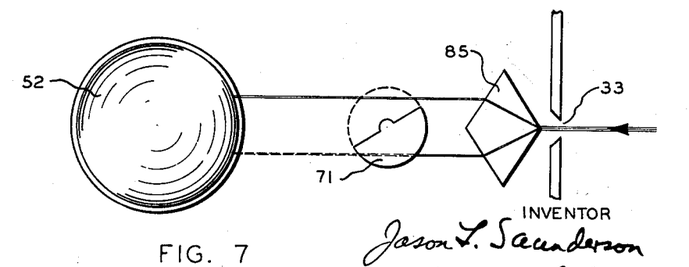
FIG. 7 is a plan view of the components shown in FIG. 6.

In FIGS. 6 and 7, the chopper includes a half-rod 71 which is driven by a synchronous motor 45. Associated with half rod 71 is a prism 85, diamond shaped in cross-section, that is positioned at exit slit 33. A single beam of monitor radiation is split into two components by prism 84 in such a way that half-rod 71 alternately interrupts one component or the other of the monitor beam.

Figure 8:
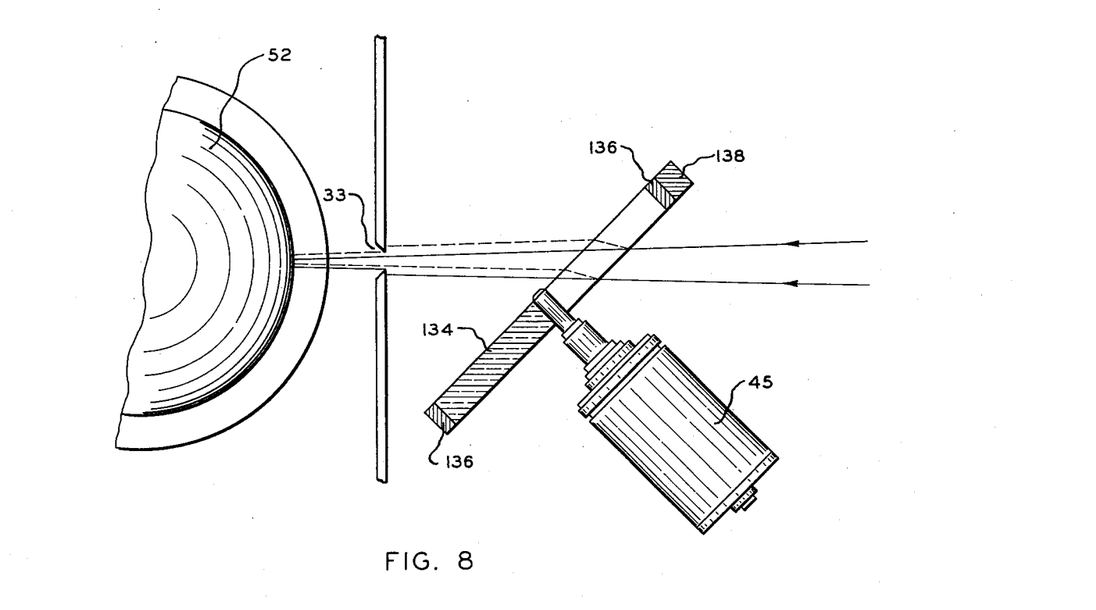
FIG. 8 is a fragmentary view, on an enlarged scale, of further modification of certain of the components of the spectrometer shown in FIG. 1.
Figure 10:
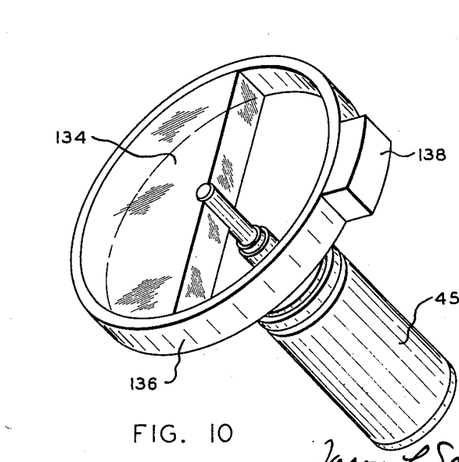
FIG. 10 is a perspective view of one of the components shown in FIGS. 8 and 9.

In FIG. 8, the chopper includes a quartz half-disk 134, as shown in perspective in FIG. 10. The axis of half-disk 134 is at an angle with respect to the direction of the monitor radiation beam. This half-disk is secured within a ring 136 having a counterpoise 138 and is driven by synchronous motor 45. When this half-disk is rotated out of the path of the monitor beam, the monitor beam is directed toward exit slit 33 as shown in the full lines. When half-disk 134 is rotated into the path of the monitor beam, the monitor beam is displaced, as shown in the dotted lines. When the grating is properly oriented the two components of the monitor beam are transmitted through slit 33 equally. When, however, the grating is improperly oriented, the two components of the monitor beam are transmitted through slit 32 unequally. The resulting unbalance operates to reorient the grating 30 by means of the above described servo system.

Figure 9:
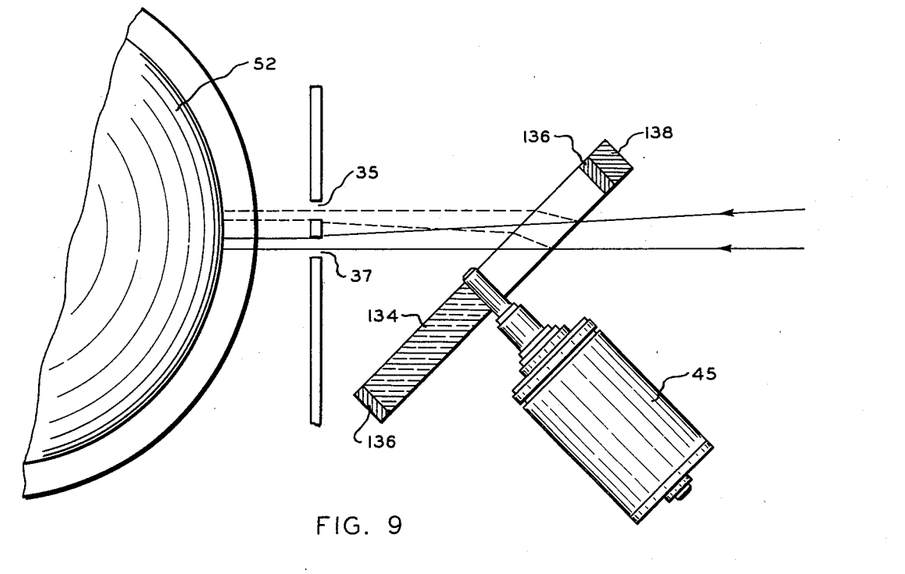
FIG. 9 is a view, similar to FIG. 8, of still a further modification of certain of the components of the spectrometer shown in FIG. 1.

The arrangement shown in FIG. 9 is similar to that shown in FIG. 8, except that two exit slits 35 and 37 are provided and the angular position or the thickness of the quartz half-disk is varied accordingly.

Figure 13:
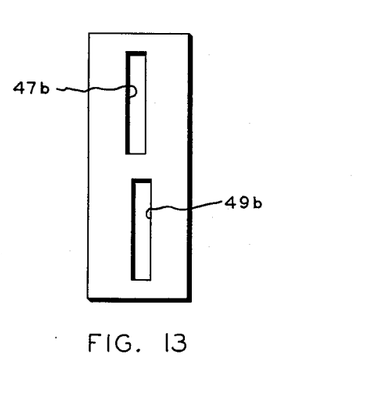
Figure 14:
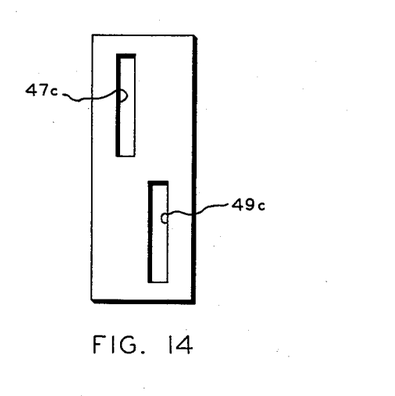

FIGS. 13 and 14 illustrate alternate arrangements of exit slits which operate in the same manner as slits 47 and 49. In FIG. 13, slits 47b and 49b overlap the axis of the incoming beam, from which axis their inner edges are equally spaced. In FIG. 14, slits 47c and 49c are spaced from the axis of the incoming beam, from which axis their inner edges are equally spaced.

The present invention thus provides a simple but efficacious novel mechanical chopper in known servo system for automatically controlling the orientation of a grating or the like with respect to input and ouput optical components spaced therefrom.

Since certain changes may be made in the above apparatus without departing from the scope of the invention herein claimed, it is intended that all matter contained in the above description or shown in the accompanying drawings shall be interpreted in an illustrative and not in a limiting sense.

What is claimed is:

1. Spectroscopic apparatus comprising excitation means for causing a chemical sample to emit characteristic radiation, monitor means including a source of monitor radiation, entrance means for said characteristic radiation and said monitor radiation, dispersing means for receiving said characteristic radiation and said monitor radiation from said entrance means, exit means for receiving said characteristic radiation and said monitor radiation from said dispersing means, said characteristic radiation from said dispersing means being in the form of spectral lines, said monitor radiation being in the form of a single beam, measuring means for determining the energy of certain of said spectral lines, chopping means for dividing said single beam into at least two portions for alternately chopping said portions, and servo means including detector means coupled to said dispersing means for receiving said monitor radiation through said chopping means, said servo means being synchronized with said chopping means for controlling the relative positions of said dispersing means, said entrance means and said exit means.

2. The spectroscopic apparatus of claim 1 wherein said chopping means constitutes a barrel shutter having an axis, said barrel shutter having two openings separated along said axis and at right angles to each other, said barrel shutter being rotatable about said axis, whereby said two portions are alternately transmitted through said two openings.

3. The spectroscopic apparatus of claim 1 wherein said chopping means includes a tuning fork, a shutter providing a pair of offset slits, and an auxiliary slit, one of said shutter and said auxiliary slit being oscillatory with said tuning fork for periodic, relative motion between said shutter and said auxiliary slit, and drive means for actuating said tuning fork.

4. Spectroscopic apparatus comprising specimen source means for applying energy in order to generate characteristic ration, monitor source means for generating monitor radiation, specimen entrance slit means for transmitting said characteristic radiation from said specimen source means, monitor entrance means for transmitting said monitor radiation from said monitor source means, diffraction grating means for diffracting said characteristic radiation from said specimen entrance slit means and said monitor radiation from said monitor entrance slit means into a spectrum of lines, specimen exit slit means for transmitting characteristic radiation associated with said lines, monitor exit slit means for transmitting monitor radiation associated with said lines, said specimen exit slit means, monitor exit slit means, diffraction grating means, specimen entrance slit means and monitor entrance slit means being geometrically related and oriented with respect to one another to provide for coincidence of said monitor radiation with said monitor exit slit means and of said specimen radiation with said specimen exit slit means, chopping means for dividing said monitor radiation into two portions and for alternately chopping said portions, specimen photodetecting means responsive to said characteristic radiation transmitted through said specimen exit slit means to indicate chemical composition, monitor photodetecting means for receiving said two portions of said monitor radiation, and servo means synchronized with said chopping means and coupled to said monitor photodetecting means for controlling the geometrical relations among the orientations of said specimen entrance slit means, said monitor entrance slit means, said diffraction grating means, said specimen exit slit means and said monitor exit slit means.

5. The spectroscopic apparatus of claim 4 wherein said chopping means constitutes a barrel shutter having an axis, said barrel shutter having two openings separated along said axis and at right angles to each other, said barrel shutter being rotatable about said axis, whereby said two portions are alternately transmitted through said two openings.

6. The spectroscopic apparatus of claim 4 wherein said chopping means includes a tuning fork, a shutter providing a pair of offset slits, and an auxiliary slit, one of said shutter and said auxiliary slit being affixed to said tuning fork, and drive means for actuating said tuning fork.

References Cited in the file of this patent
UNITED STATES PATENTS 2,937,561     Saunderson et al.  \_\_\_\_\_\_\_ May 24, 1960